(12) United States Patent
Cheung (10) Patent No.: US 7,234,146 B1
(45) Date of Patent: Jun. 19, 2007

(54) OBJECT IN, OBJECT OUT TECHNIQUE

(75) Inventor: Tom Thuan Cheung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,370

(22) Filed: Jul. 30, 1999

(51) Int. Cl.
*G06F 13/00* (2006.01)

(52) U.S. Cl. ............... 719/316; 719/315; 719/330; 719/331; 719/332; 707/103 Y; 709/201; 709/205

(58) Field of Classification Search ......... 709/313, 709/314, 315, 318, 310, 200, 203; 719/310, 719/315, 316; 707/103 R
See application file for complete search history.

(56) References Cited

U.S. PATENT DOCUMENTS

| | | | | |
|---|---|---|---|---|
| 5,446,896 A | * | 8/1995 | Hegarty et al. ............... 707/1 |
| 5,544,255 A | * | 8/1996 | Smithies et al. ............ 382/119 |
| 5,848,271 A | * | 12/1998 | Caruso et al. ............... 395/680 |
| 5,864,862 A | * | 1/1999 | Kriens et al. ............ 707/103 R |
| 6,003,094 A | * | 12/1999 | Dean ............................. 709/303 |
| 6,138,140 A | * | 10/2000 | Yokote ........................ 709/203 |
| 6,253,248 B1 | * | 6/2001 | Nakai et al. ................. 709/237 |
| 6,347,342 B1 | * | 2/2002 | Marcos et al. .............. 719/315 |
| 6,378,001 B1 | * | 4/2002 | Aditham et al. ............. 709/313 |
| 6,385,660 B2 | * | 5/2002 | Griesemer et al. ........... 719/315 |
| 6,442,620 B1 | * | 8/2002 | Thatte et al. ................ 719/316 |
| 6,496,871 B1 | * | 12/2002 | Jagannathan et al. ....... 709/317 |
| 6,625,603 B1 | * | 9/2003 | Garg et al. ..................... 707/9 |
| 6,658,625 B1 | * | 12/2003 | Allen ........................... 715/523 |
| 6,710,786 B1 | * | 3/2004 | Jacobs et al. ................ 715/744 |
| 6,714,991 B1 | * | 3/2004 | Bak et al. .................... 719/316 |
| 6,745,252 B1 | * | 6/2004 | Yanagawa et al. ............. 710/8 |
| 6,769,124 B1 | * | 7/2004 | Schoening et al. .......... 719/316 |
| 6,810,522 B2 | * | 10/2004 | Cook et al. .................. 719/316 |

* cited by examiner

*Primary Examiner*—William Thomson
*Assistant Examiner*—Andy Ho
(74) *Attorney, Agent, or Firm*—Sughrue Mion, PLLC (57) ABSTRACT

The present invention discloses a technique for processing input objects to generate output objects. Initially, an input object is received. The received input object contains input data and one input function. A type of the received input object is determined. Based on the determined type, it is ascertained whether the received input object satisfies one or more predefined requirements. When it is ascertained that the input object satisfies each predefined requirement, the input function is executed.

31 Claims, 4 Drawing Sheets

OBJECT IN, OBJECT OUT TECHNIQUE

BACKGROUND OF THE INVENTION

1. Field of the Invention

This invention relates in general to computer systems, and, in particular, to a technique for processing input objects to generate output objects.

2. Description of Related Art

In many development environments, one or more development teams can work on various systems that interface with each other. For example, a first group of developers may be responsible for maintaining a banking system that accesses a shared database to process a request for information. A second group of developers may be responsible for maintaining the database. In conventional systems, for the first group of developers and the second group of developers to build the banking system and database, each group needs to understand the work being done by the other group.

In this environment, producing an output desired by the first team of developers is typically related to whether the independently developed systems are compatible. Problems generally arise when inconsistencies exist between the systems. To illustrate, suppose that the banking system provides inputs to the database system, which executes a function using the inputs and returns data to the banking system. In this case, if the input contains parameters that are inconsistent with the function's parameter requirements, the function will not execute properly, and thus, will not produce a valid output.

Therefore, in traditional development environments, one or more members of each development team are required to understand the logic of systems that are dependent on their team's system. For instance, at least one member of the first team would typically need to understand the internal logic of the function executed by the database system. Additionally, each team would have to track changes to the internal logic of the other team's systems. Developing one system, while tracking the development of another system, may increase the time required to develop either system. This task is further exacerbated when each dependent system contains complex programming logic.

Therefore, there is a need in the art for an improved technique for processing input objects to generate output objects that eliminates the necessity of developers for a first system needing to understand the internal logic of a second system with which the first system interacts.

SUMMARY OF THE INVENTION

To overcome the limitations in the prior art described above, and to overcome other limitations that will become apparent upon reading and understanding the present specification, the present invention discloses a method, apparatus, and article of manufacture for processing input objects to generate output objects.

In accordance with the present invention, an input object is received. The received input object contains input data and one input function. A type of the received input object is determined. Based on the determined type, it is ascertained whether the received input object satisfies one or more predefined requirements. When it is ascertained that the received input object satisfies each predefined requirement, the input function is executed.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by of illustration a specific embodiment in which the invention may be practiced. It is to be understood that other embodiments may be utilized as structural changes may be made without departing from the scope of the present invention.

Hardware Environment

Figure 1:
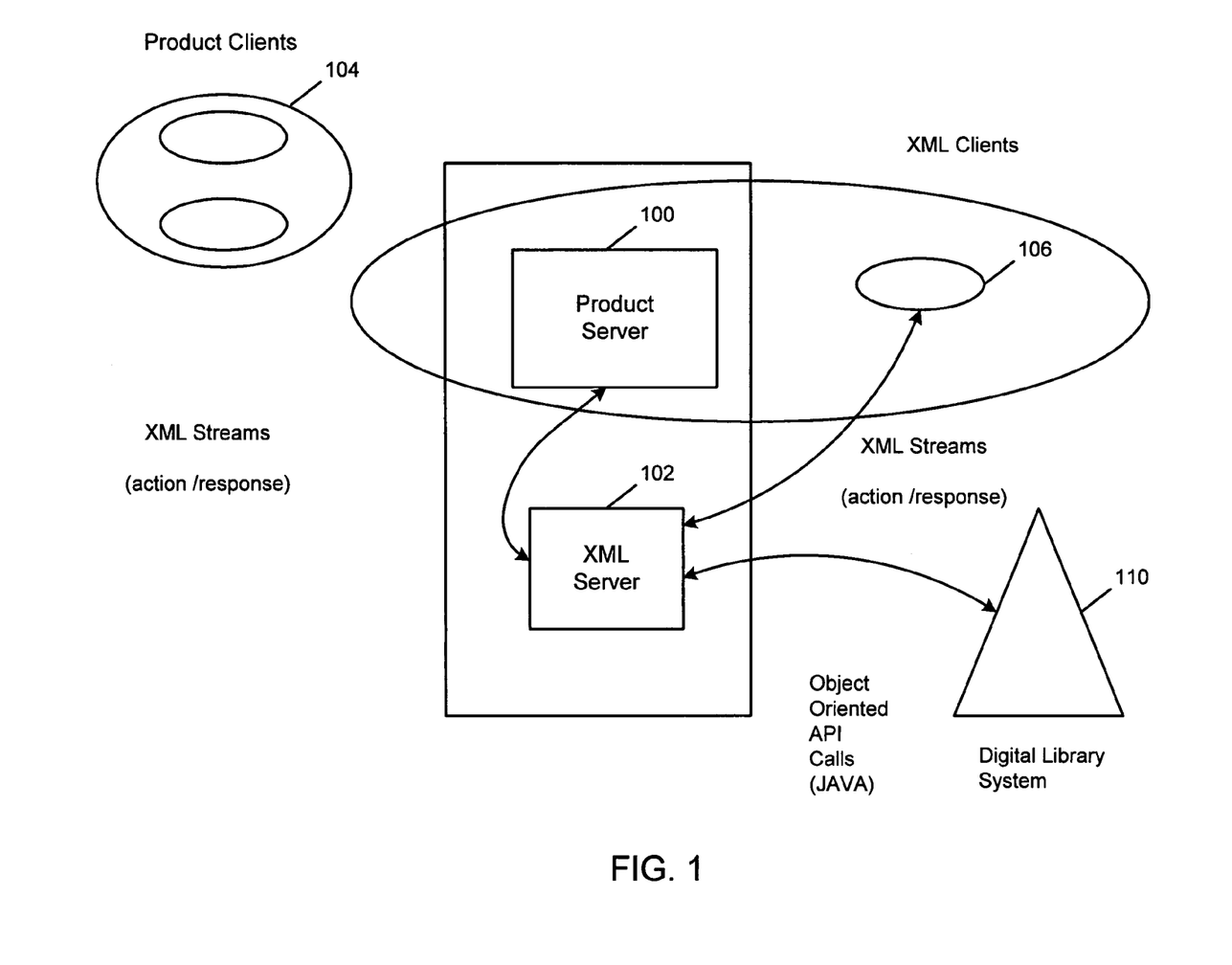
FIG. 1 illustrates a block diagram of a computer hardware environment that could be used in accordance with a preferred embodiment of the present invention.

FIG. 1 illustrates a block diagram of a computer hardware environment that could be used in accordance with a preferred embodiment of the present invention. In particular, FIG. 1 is a block diagram illustrating the interaction of a Product system and the Digital Library system. The Product system is comprised of a Product Server 100 and Product Clients 104. The Product server 100 communicates with the Digital Library system ("Digital Library") 110 via and eXtensible Markup Language (XML), which enables a user to create documents that contain links to multiple other documents on the Internet. An XML server 102 receives XML commands from the Product server 100 and from other XML clients 106. The XML server 102 processes the XML commands to access data in the Digital Library 110.

The XML server 102 communicates with a Digital Library System 110 via Object Oriented (OO) Application Programming Interface (API) calls (e.g., in the JAVA programming language). The XML server 102 communicates with the Product server 100 and the XML clients 106 via XML streams (i.e., action/response). XML commands that require a Digital Library 110 response (action) are parsed with the necessary parameters and passed to the Digital Library 100. The Digital Library 110 processes the command and returns a response.

In particular, the XML server 102 processes incoming XML action streams from XML clients. The XML server 102 spawns an agent to do the work and return a response XML stream. The XML server 102 also handles Product server 100 transaction requests. Additionally, the XML server 102 identifies requests from the Product server 100 or XML clients 106 to access the Digital Library 110. Additionally, the XML server 102 processes responses received from the Digital Library 110 to determine whether there was success or failure. Moreover, there may be multiple connections to the Digital Library 110. The Digital Library 110, in processing requests received from the XML server 102, modifies Product specific Digital Library tables in conjunction with normal database functions while processing the request.

In one embodiment, the Product server 100 and the Digital Library 110 are connected via the Internet. The Internet is a collection of computer networks that exchange information via Transmission Control Protocol/Internet Protocol ("TCP/IP"). The Internet computer network consists of many internet networks, each of which is a single network that uses the TCP/IP protocol suite. Currently, the use of the Internet computer network for commercial and non-commercial uses is exploding. Via its networks, the Internet computer network enables many users in different locations to access information stored in data sources (e.g., databases) stored in different locations.

The World Wide Web (i.e., the "WWW" or the "Web") is an information and communication system used on the Internet computer network with data communications operating according to a client/server model. Typically, a Web client computer (e.g., a Product client will request data stored in data sources from a Web server computer (e.g., a Product server 100), at which Web server software resides. The Web server software interacts with an interface connected to, for example, the XML server 102, which is connected to the data sources (e.g., the Digital Library 110). Thus, the Product server 100 communicates with the Digital Library 110 through eXtensible Markup Language (XML) commands that are processed by the XML server 102.

The preferred embodiment improves integration of the Digital Library and a production system in which the Product has its own file storage up to the point of publication of digital media. The Digital Library interface enables archival of file objects via the Digital Library system, enables placement of metadata information in the Digital Library, enables storage and maintenance of data, and enables storage of file objects into the Digital Library. In one embodiment of the invention, the Digital Library interface is implemented in the Java programming language.

The Digital Library architecture is based on a triangular client/server model comprised of a Library Server, one or more multimedia Object Servers, and one or more clients. The core of the infrastructure is the Library Server. The Library Server, using IBM DB2 or Oracle database services, manages the Digital Library catalog information, locates stored objects using a variety of search technologies, provides secured access to the objects held in the collection, and communicates with the Object Servers. The digital content is stored in Object Servers. Object Servers support the attachment of DASD and other media devices, and can be distributed across an enterprise network to provide convenient user access. The end user, on a client desktop, receives direct access to the information requested from the collection regardless of where the data is stored. Many clients can be connected to the Library and Object Server in a Digital Library system, including those accessing the Digital Library using supported Web browsers.

A preferred embodiment of the present invention works in conjunction with object-oriented languages that support polymorphism. Polymorphism refers to a programming language's ability to process objects differently depending on their data type or class. The preferred embodiment of the present invention also works in conjunction with object-oriented languages that use synchronization control and inheritance. Those skilled in the art will recognize that other object-oriented languages may be used without departing from the scope of the present invention.

The object in, object out technique of the preferred embodiment of the invention is preferably implemented in one or more computer programs or applications. These computer programs may be part of the Digital Library 110. Generally, the computer programs implementing the techniques of the invention are tangibly embodied in and/or readable from a device, carrier, or media, and/or remote devices coupled to a computer via data communication devices. Those skilled in the art will recognize that the hardware environment illustrated in FIG. 1 is not intended to limit the present invention. Indeed those skilled in the art will recognize that other alternative hardware environments may be used without departing from the scope of the present invention.

An Object in, Object Out Technique

In one embodiment of the invention, an object in, object out technique merges traditional functional design with object oriented techniques. The object in, object out technique is applied to minimize the external knowledge of the internal workings of a package by requiring them to set predefined input parameters for a singular unit of work (i.e., task). In one embodiment of the invention, the singular unit of work is a function. In the black box approach of the object in, object out technique, a central module is created to regulate and control the flow of input objects to generate expected output objects. This benefits external modules as it enforces the consistency of the calls and the requirement of providing all necessary parameters. Thus, the object in, object out technique makes the integration between two systems easier and enables the external/internal design documentation to be easily separated.

Figure 2:
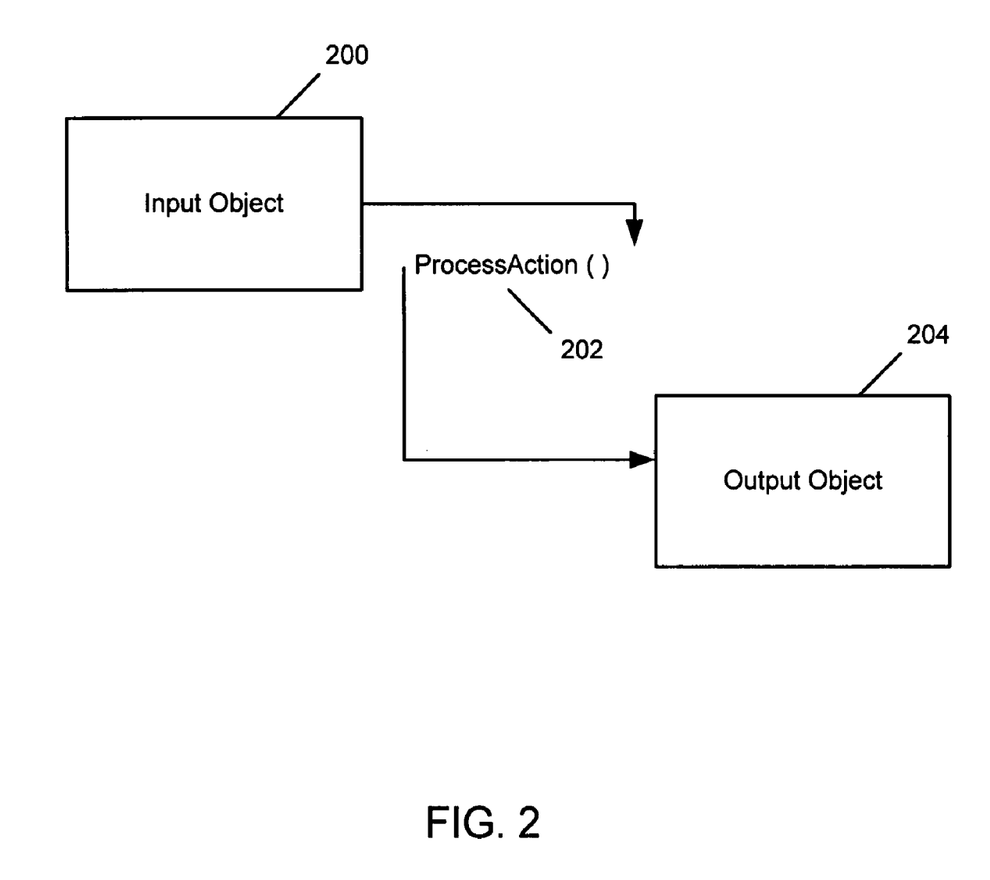
FIG. 2 illustrates a block diagram providing an example of the use of the techniques of the present invention with regard to a XML server and a Digital Library.

FIG. 2 illustrates a block diagram providing an example of the use of the techniques of the present invention. An input object 200 is initialized and then populated with values. The input object 200 is processed with a ProcessAction ( ) block 202. The ProcessAction ( ) block 202 executes one or more functions. If these functions execute successfully, the ProcessAction ( ) block 202 executes an input function associated with the input object 200. The result of executing the input function is used to generate an output object 204.

The object in, object out technique is intended for singular functional packages that are to be exposed (communicated) between members of a team or customer. The object in, object out technique is used to expose the complex programming logic of a system only on a need to know basis. The object in, object out technique consists of two object pairs (i.e., an input object and an output object) for every singular function that may be invoked by a central controller object.

In the following example, one team is developing a Product to work with a Server, which is being developed by another team. In order to have these teams develop software using the object in, object out technique of the present invention, the team developing the Product provides the following:

1. Object code to enable the Server to interface with their code.
2. Documentation describing use (integration) of the object code.
3. Documentation of detailed design concerning each specific command that is to be integrated into the Server interface.

Note that the logic translated will be restricted to logic which directly relates to the manipulation of the tables that are handled by the Server, including element tables and event tables.

Additionally, there are two phases of the development process. The first phase is the specification phase and the second phase is the actual development phase. During the specification phase, Product 102 developers define the input object requirements (i.e., the input data requirements) and the function requirements (i.e., the functions to be invoked by the central controller object are defined). The functions are also dissected to formalize all necessary data that is needed at the state right before the invocation of the function, to document all function logic, and to specify the expected result (i.e., a range of possible results).

The information collected as necessary data that is needed at the state right before the invocation of the function is stored as variables in the input object. The developers of the Input object are also responsible for the implementation of the function logic for functions that are part of that input object. Note that an input object may comprise both data and functions. The output object is generated as a result of executing the function or functions associated with the input object.

For the input data, the Product 102 developers identify the data necessary to execute the input function. As an example, the Product 102 may be a banking system that retrieves a customer's account balances in a Server (e.g., Digital Library). One input function for the banking system may be to store data in the Server. Exemplary input data for this input function may include a customer name, a customer branch, and a customer account number. Once the data is defined, it is stored as variables in the input object.

In deciding what variables are to be part of the input object, developers also identify factors that relate to whether the input data is reasonable. In the banking system example discussed above, such factors could include whether the user using the bank system to obtain information is authorized to access the information in the Server (i.e., whether the account number is valid). This type of factor is not required to execute the input function. That is, this factor is not required to perform the task of providing the customer with account balances. Instead, the object in, object out technique evaluates this factor to determine whether to invoke the input function (i.e., whether to provide the customer with account balances).

Figure 3:
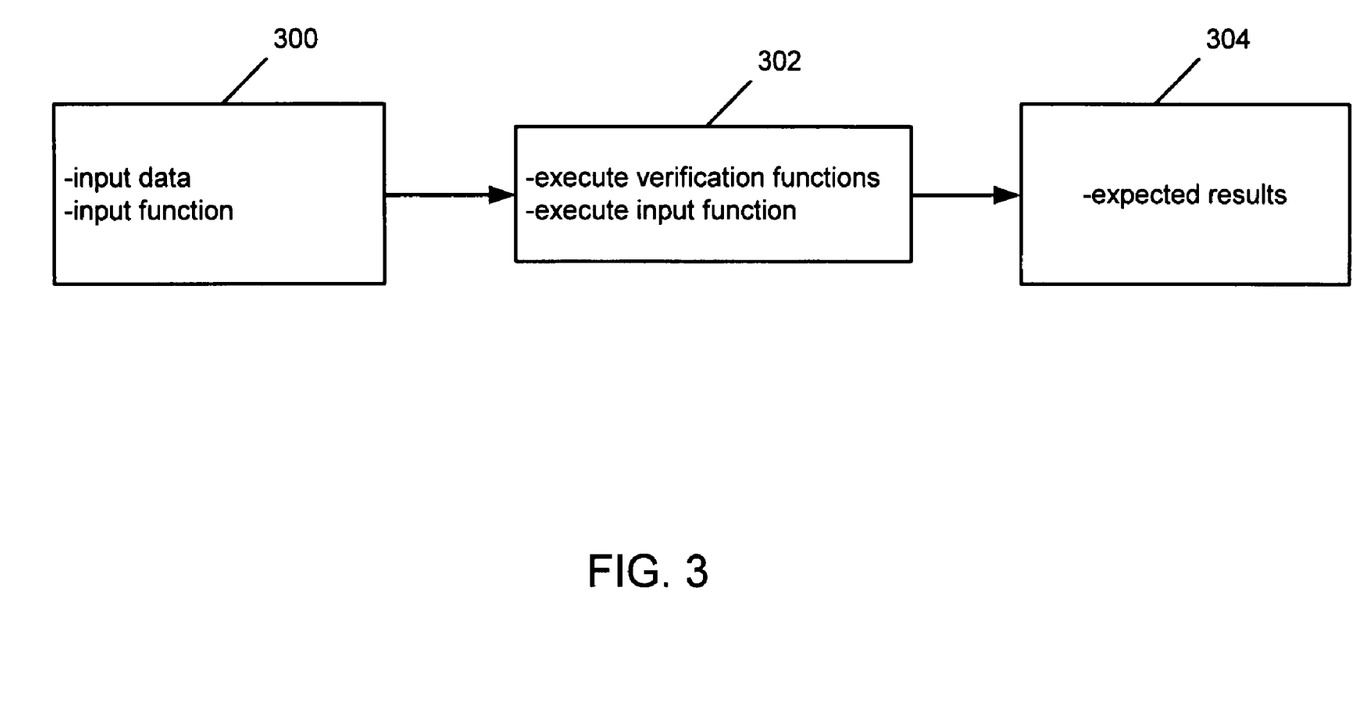
FIG. 3 illustrates an input object, controller object, and output object that are used in accordance with a preferred embodiment of the present invention.

FIG. 3 is a block diagram of an input object 300, a controller object 302, and an output object 304. The input object 300 contains previously specified (i.e., in the specification phase) input data. Additionally, the input object 300 contains an input function. The input function typically uses some of the input data.

The input object 300 is passed to a controller object 302. The controller object 302 determines whether there are any verification functions that must be invoked prior to invoking the input functions. The verification functions may also use the input data. If verification functions are to be invoked, the controller object 302 invokes the verification functions. If the verification functions execute successfully, the controller object 302 invokes the input function. When the input function is invoked, an output object 304 is generated.

The verification functions identify a type (i.e., object type or type of function) of the input object and perform a verification process. With regard to determining the type, most object-oriented languages that support polymorphism contain the ability to recognize the type of an object during execution. In the present invention, the type is related to the task performed by the input function. The type is associated with one or more verification functions. For example, if the controller object 302 determines that the type of the input object is based on retrieving account balances, the controller object 302 recognizes that the verification function to determine whether the account number is valid must be invoked.

That is, based on the determined type, the controller object 302 performs the verification process. The verification process has two prongs. The first prong involves determining whether the input data passed into the controller object 302 contains all the data necessary to execute the input function. The controller object calls an input data verification subroutine, which compares the input data passed into the controller object 302 with the input data required to execute any input functions or verification functions. If there is a match, then the controller object proceeds to the second prong. Otherwise, the input data verification subroutine produces an error message indicating that the input data lacks the necessary data. The controller object returns the error message to an application and/or computer user.

The second prong involves determining whether there are any verification functions to be executed. Each verification function can cross-reference relevant databases. To illustrate, in the banking system example, the controller object 302 determines whether the account number is valid prior to executing the input function to retrieve account balances.

In one embodiment, function calls to the verification functions are located in a predefined section of the controller object 302 source code. This predefined placement of calling code simplifies the task of adding new verification functions because both the new and existing functions reside in the same section of the source code. Hence, new verification functions are added to controller object 304 without major changes to the controller object 302 source code. To clarify, with minimal source code changes, new verification functions can be used in conjunction with the existing verification functions.

By performing the two prong verification process described above, the controller object 302 ensures that the input object can be validly invoked to produce an output object 304 which contains expected results. If the input object passes the verification process, then the controller object 302 executes the input function. The input function produces the data for the expected result. The controller object 302 then produces an output object 304 that contains the expected results. The controller object 302 returns the output object 304 to either an application and/or a computer user. Otherwise, if the input object fails the verification process, the controller object 302 may halt execution or return an error message to the application and/or computer user.

When returning an error message, the controller object 304 can optionally request that the user modify the input data so that the verification process is successful. For instance, if the controller object 302 determines that the account number is not valid, the controller object 302 may request the correct account number. Further logic can be implemented in the controller object to produce error messages. The logic and error messages are defined during the specification phase.

The developers developing the input object 300 are not required to know about or understand the verification functions called by the controller object 302. Hence, the controller object 302 is similar to a black box that receives an input and produces an output, without revealing the technique for producing the output. Further, since the input and output requirements are defined during the specification phase, the team members can begin the development phase without having an extensive knowledge of the overall system. This allows a quicker learning curve for new team members who can follow specifications without the need to know about the overall system. Moreover, the use of the controller object 302 restricts the possibility of deviation from the specifications, allowing for more time for actual development, instead of fixing human errors. In addition, new verification functions can be added with minimal changes to the working system because of the predefined placement of calling code.

Details of an exemplary input object 300, controller object 302, and output object 304 are shown below. The input object, entitled Object In, contains sample input data, a sample input function, and sample subroutines. The sample input data includes an integer, string, and boolean. This input data is necessary for the execution of the input function. The following is pseudocode for an input object:

```
Object In
{
    int inputA;                              //data identified as
    String inputB;                           //necessary input for the
    boolean inputC;                          //specific function.
    ...
    void process Function( );
    int subroutineA (float paramA, boolean   //implementation of
    paramB);                                 //specific functions
}
```

The input function is a polymorphic function entitled "void process." All input functions that are contained in an input object must have an identical signature. The controller object 302 will only accept input functions that have this signature. The signature is defined during the specification phase. The signature refers to the unique features of the function. In an embodiment of the invention, the unique features are the function name, the variables passed into the function, and the operations performed by the function. In this example, no variables are passed into the function. With respect to the operations, each input object performs the same operations contained in the input function.

When an input object needs to perform additional operations to achieve its singular unit of work (i.e., task), the input object invokes subroutines. These input subroutines perform additional operations and use the input data to complete the singular unit of work. Each input object can contain different input routines. Several routines can be used to partition the singular unit of work into logical blocks of code. In the example, the sample routine is entitled "int subroutineA" and the integer and boolean input variables are passed to the subroutine. Routines used by the input object 300 to complete its singular unit of work are not revealed to the controller object 302. Hence, developers that create the controller object 302 do not have to know or understand the internal logic of the subroutines.

The output object, entitled Object Out, is produced by the controller object. The output object contains the results that were defined during the specification phase as expected results or possible results. The results are produced by the input function. In this example, the results are a boolean and string. The output object may also optionally contain functions to assist a user with interpreting the results. Optional functions, entitled "void print" and "boolean get OutputA", are shown in the output object. These optional functions may be useful when the result contains a large amount of data. The optional functions can filter the result and only return variables that are relevant to the user. The following is pseudocode for an output object:

```
Object Out
{
    boolean outputA;              //result values identified
    String outputB;               //as possible returned data
    ...                           //during the specification
                                  //phase
    void print A( );
    boolean get OutputA( );       //utilities to assist user in
    ...                           //interpreting result values.
}
```

The controller object contains variables for regulating the flow of input objects and controller object functions that invoke the input function. The controller object regulates or controls the flow of input objects in a multi-threaded and multi-process environment. The variable used to regulate control is an integer and the function used to regulate control is entitled Stack requests. For example, suppose the controller object 302 receives ten input objects. Suppose further that controller object 302 is capable of processing three objects in parallel. The controller object 302 may process the three objects and place the seven remaining input objects in a queue. Alternatively, the controller object 302 could send a message to the user indicating that it can only process three input objects. The user can than decide whether to place the remaining objects in a queue or resubmit the remaining object at a later time. The controller object also contains the verification functions that perform the verification process and calls the input function. The following is pseudocode for a controller object:

```
Controller object
{
    int counter;                                //variables used for more
    Stack requests;                             //complex processing of
    ...                                         //functions.
    Object process Action (Object Object-In);   //central calling method
                                                to
    ...                                         //process the set of
                                                singular
                                                //functions
}
```

In summary, the controller object receives input from the input object. The controller object then determines the type of the input object. Based on the type, the controller object performs a verification process. If the input object passes the verification process, the controller object executes the input function. Otherwise, if the input object fails the verification process, the controller object halts execution of the program or returns an error message to the application and/or user.

Figure 4:
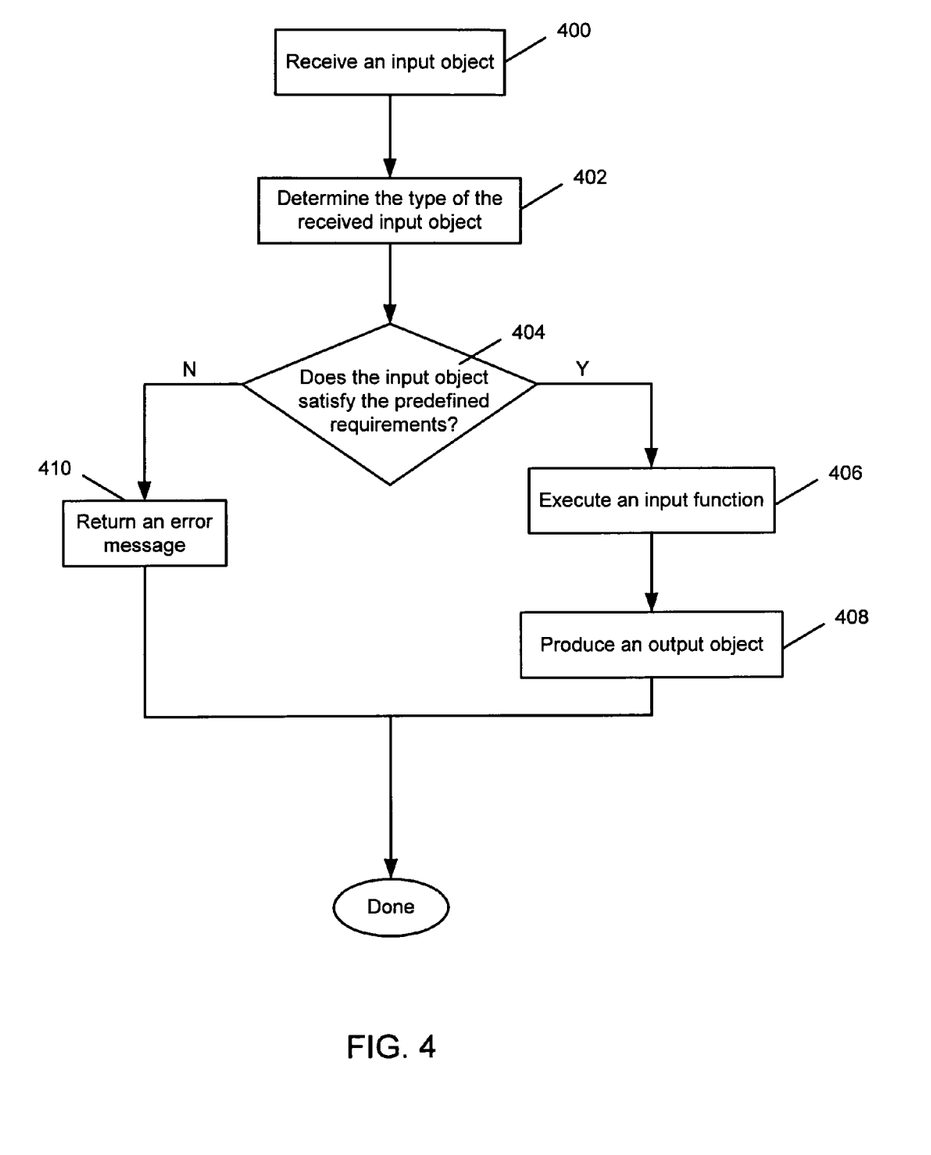
FIG. 4 is a flow diagram illustrating steps performed to produce an output object accordance with a preferred embodiment of the present invention.

FIG. 4 is a flow diagram illustrating the steps performed by the controller object 402 (shown in FIG. 3) to produce an expected output object in accordance with the preferred embodiment of the present invention. Note that FIG. 4 refers to the following items, which are shown in FIG. 3: the input object 300, the controller object 302, and the output object 304.

Block 400 represents the controller object 302 receiving an input object. The controller object 302 then determines the type of the input object 300, as represented in block 402.

Block 404 is a decision block that represents the controller object 302 performing the verification process. In particular, the controller object 302 is ascertaining whether the input object satisfies the requirements that were defined during the specification phase. If the input object 300 satisfies the predefined requirements, then the controller object 302 proceeds to block 406. Otherwise, the controller object proceeds to block 410.

Block 406 represents the controller object 302 executing the input function. The controller object 302 then produces the output object using the result produced by the executed input function, as represented by block 408.

If the input object 300 does not satisfy each predefined requirement, then the controller object 302 returns an error message to the application or to the user, as represented by block 410.

Because the input and output parameters are specified, it is much easier to being development without having an extensive knowledge of the overall system. This allows a quicker learning curve for new developers and users who can follow specifications without the need to know about the overall system. The inherent usage of a controller object restricts the possibility of deviation from the specifications, allowing for more development time for actual development instead of fixing human errors. Additionally, new singular functions can be added with minimal changes to the working system because of the predefined placement of calling code.

Digital Library Example

In a preferred embodiment of the invention, the techniques of the invention are used to provide improved integration between a Digital Library System ("the Digital Library"), from International Business Machines Corporation, and a Product that accesses the Digital Library.

The Digital Library is an advanced database for storing digital image files. This digital media may be text, full-motion video, audio, graphics, or images. The Digital Library enables petabytes of text, images, audio and video, to be created or transformed into digital form, stored in the Digital Library, and distributed over any network, with security, to users around the world. The Digital Library provides management and reuse of media assets, preserves assets from physical deterioration, protects assets with advanced rights management, and consolidates management of text, images, audio and video.

The Product may be any system that may use the Digital Library. For example, the Product may comprise a product for a banking system, for a media production group, for print and Web publishers, or for researchers and teachers. The Digital Library provides media asset (i.e., digital media) solutions with sufficient storage capacity, scalability, speed, multi-level security, sophisticated searching techniques and Internet access to reach new markets, preserve assets from loss or deterioration, and ensure copyright protection.

The following is an example that applies the techniques of the embodiment of the invention to the Digital Library and a XML server (i.e., a Product). The XML server 102 initializes an input object. At the XML server 102, for each XML action, the XML server 102 spawns an agent to handle the request. When the action is a request to access the Digital Library 110, the XML server 102 parses the XML stream to populate the input object specified for that Digital Library 110 request. The XML server 102 passes the input object to the process action method 202 (i.e., OO API code). An output object is returned to the XML server 102 from the Digital Library 110 with success and failure information as well as requested data, when there is success.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with embodiments of the present invention.

The foregoing description of the preferred embodiment of the invention has been presented for purposes of illustration and description. It is not intended to be exhaustive or to limit the invention to the precise form disclosed. Many modifications and variations are possible in light of the above teaching. It is intended that the scope of the invention be limited not by this description, but rather by the claims appended hereto.

What is claimed is:

1. A method of producing an output object, the method comprising the steps of:
    receiving an input object, wherein the received input object contains input data and one input function executable on a computer;
    determining a type of the received input object;
    based on the determined type, ascertaining whether the received input object satisfies one or more predefined requirements;
    when it is ascertained that the received input object satisfies each predefined requirement, executing the input function on the computer,
    wherein the input function comprises computer-implemented programming instructions; and
    performing a verification comprising:
        determining whether the input data contains all data necessary to execute the input function; and
        determining whether there are verification functions to be executed.

2. The method of claim 1, wherein the step of ascertaining further comprises ascertaining whether the received input object satisfies one or more predefined requirements by executing one or more verification functions.

3. The method of claim 2, wherein a source code for each verification function is located in a predefined section of a controller object source code.

4. The method of claim 1, further comprising the step of producing an output object by using a result produced by the executed input function.

5. The method of claim 4, wherein the received input object is received from an application, and wherein the method further comprises the step of returning the output object to the application.

6. The method of claim 4, wherein the received input object is received from a user and wherein the method further comprises the step of returning the output object to the user.

7. The method of claim 1, wherein the step of receiving comprises receiving a plurality of input objects, wherein each received input object contains an input function, and wherein each input function has a predefined signature.

8. The method of claim 7, wherein the method further comprises the step of regulating a flow of received input objects.

9. The method of claim 8, regulating the flow comprises storing some of the received input objects in a queue.

10. The method of claim 8, wherein regulating the flow comprises the steps of:
    returning some of the received input objects to a sender; and requesting that the sender re-send the received input objects at a later time.

11. An apparatus for producing an output object, comprising:
a computer;
one or more computer programs, performed by the computer, for receiving an input object, wherein the received input object contains input data and one input function executable on a computer, determining a type of the received input object, based on the determined type, ascertaining whether the received input object satisfies one or more predefined requirements, when it is ascertained that the received input object satisfies each predefined requirement, executing the input function on the computer,
wherein the input function comprises computer-implemented programming instructions, and
performing a verification comprising:
determining whether the input data contains all data necessary to execute the input function; and
determining whether there are verification functions to be executed.

12. The apparatus of claim 11, wherein the means of ascertaining further comprises ascertaining whether the received input object satisfies one or more predefined requirements by executing one or more verification functions.

13. The apparatus of claim 12, wherein a source code for each verification function is located in a predefined section of a controller object source code.

14. The apparatus of claim 11, wherein the apparatus further comprises one or more computer programs executing on the computer for producing an output object by using a result produced by the executed input function.

15. The apparatus of claim 14, wherein the received input object is received from an application, and wherein the apparatus further comprises one or more computer programs, performed by the computer for returning the output object to the application.

16. The apparatus of claim 14, wherein the received input object is received from a user, and wherein the apparatus further comprises one or more computer programs, performed by the computer for returning the output object to the user.

17. The apparatus of claim 11, wherein the means of receiving comprises receiving a plurality of input objects, wherein each received input object contains an input function, and wherein each input function has a predefined signature.

18. The apparatus of claim 17, wherein the apparatus further comprises one or more computer programs, performed by the computer for regulating a flow of received input objects.

19. The apparatus of claim 18, wherein regulating the flow comprises storing some of the received input objects in a queue.

20. The apparatus of claim 18, wherein the flow comprises:
one or more computer programs, performed by the computer for returning some of the received input objects to a sender, and requesting that the sender re-send the received input objects at a later time.

21. An article of manufacture comprising a computer program readable storage medium embodying one or more instructions executable by a computer to perform method steps for producing an output object, the method comprising the steps of:
receiving an input object, wherein the received input object contains input data and one input function executable on a computer;
determining a type of the received input object;
based on the determined type, ascertaining whether the received input object satisfies one or more predefined requirements;
when it is ascertained that the received input object satisfies each predefined requirement, executing the input function on the computer,
wherein the input function comprises computer-implemented programming instructions; and
performing a verification comprising:
determining whether the input data contains all data necessary to execute the input function; and
determining whether there are verification functions to be executed.

22. The article of manufacture of claim 21, wherein the step of ascertaining further comprises ascertaining whether the received input object satisfies one or more predefined requirements by executing one or more verification functions.

23. The article of manufacture of claim 22, wherein a source code for each verification function is located in a predefined section of a controller object source code.

24. The article of manufacture of claim 21, wherein the method further comprises the step of producing an output object by using a result produced by the executed input function.

25. The article of manufacture of claim 24, wherein the received input object is received from an application, and wherein the method further comprises the step of returning the output object to the application.

26. The article of manufacture of claim 24, wherein the received input object is received from a user, and wherein the method further comprises the step of returning the output object to the user.

27. The article of manufacture of claim 21, wherein the step of receiving comprises receiving a plurality of input objects, wherein each received input object contains an input function, and wherein each input function has a predefined signature.

28. The article of manufacture of claim 27, wherein the method further comprises the step of regulating a flow of received input objects.

29. The article of manufacture of claim 28, wherein regulating the flow comprises storing some of the received input objects in a queue.

30. The article of manufacture of claim 28, wherein regulating the flow comprises the steps of:
returning some of the received input objects to a sender; and
requesting that the send re-send the received input objects at a later time.

31. The method according to claim 1, wherein said input function comprises instructions in a mark-up language.

* * * * *